(12) United States Patent
Bening et al.

US006242537B1

(10) Patent No.: US 6,242,537 B1
(45) Date of Patent: *Jun. 5, 2001

(54) GEL-FREE PROCESS FOR MAKING HYDROGENATED FUNCTIONALIZED ANIONICALLY POLYMERIZED POLYMERS

(75) Inventors: Robert Charles Bening, Katy; Carl Lesley Willis, Houston; Charles Roy Donaho, Richmond; Daniel Earl Goodwin, Katy; Zaida Diaz; John David Wilkey, both of Houston, all of TX (US)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,239

(22) Filed: Mar. 2, 1999

Related U.S. Application Data

(60) Provisional application No. 60/079,876, filed on Mar. 30, 1998.

(51) Int. Cl.$^7$ ......................................................... C08F 8/04
(52) U.S. Cl. .................. 525/338; 525/332.8; 525/332.9; 525/333.1; 525/333.2; 525/339
(58) Field of Search ...................... 525/338, 339

(56) References Cited

U.S. PATENT DOCUMENTS

| 4,442,039 | 4/1984 | Murphy et al. ................... 260/465.4 |
| 4,480,075 | 10/1984 | Willis ..................... 525/247 |
| 4,518,753 | 5/1985 | Richards et al. ..................... 526/177 |
| 4,851,476 | * 7/1989 | Willis ..................... 525/338 |
| 5,063,190 | 11/1991 | Hargis et al. ........................ 502/157 |
| 5,166,277 | 11/1992 | Goodwin et al. ................... 525/338 |
| 5,171,791 | 12/1992 | Marchand et al. ................... 525/314 |
| 5,175,247 | 12/1992 | Magni et al. ......................... 528/485 |
| 5,202,499 | 4/1993 | Hargis et al. ........................ 568/587 |
| 5,216,181 | 6/1993 | Hargis et al. ........................ 549/513 |
| 5,391,663 | * 2/1995 | Bening et al. ....................... 525/338 |
| 5,397,851 | 3/1995 | Knauf et al. .......................... 526/92 |
| 5,412,045 | 5/1995 | Osman et al. ....................... 526/133 |

FOREIGN PATENT DOCUMENTS 48-066678   9/1973   (JP) .

OTHER PUBLICATIONS

"Solid–State NMR of Aromatic Polyamides," by S. A. Curran, C. P. LaClair, and S. M. Aharoni, *Macromolecules* 1991, 24, pp. 5903–5909.
*Comprehensive Organometallic Chemistry* , vol. 7, pp. 424–427, 1982.

* cited by examiner

*Primary Examiner*—Bernard Lipman
(74) *Attorney, Agent, or Firm*—Donald F. Haas

(57) ABSTRACT

This invention relates to a gel-free process for making hydrogenated functionalized polymers that mitigates the problem of ionic gel. When multi-alkali metal initiators are used to make these polymers anionically, the process comprises anionically polymerizing at least one monomer with a multi-alkali metal initiator, usually a lithium alkyl, in a hydrocarbon solvent, capping the polymer by adding to the polymer a capping agent that reacts with the ends of the polymer chains such that strongly associating chain ends are formed wherein a strongly associating polymer gel is formed, adding a trialkyl aluminum compound to the polymer gel, whereby the gel dissipates, optionally terminating the polymerization by addition of an alcohol, washing the polymer with aqueous acid, preferably aqueous mineral acid, most preferably phosphoric acid, wherein there is at least one mole of phosphoric acid per mole of alkali metal and at least three moles of phosphoric acid per mole of aluminum, and hydrogenating the polymer with a hydrogenation catalyst. In a second embodiment, the present invention relates to a process for making such polymers which comprises anionically polymerizing them as described and adding a trialkyl aluminum compound prior to the addition of the functionalizing agent and washing the product prior to hydrogenation as described above. In the first embodiment, a gel is formed and then removed. In the second embodiment, the gel never is formed because of the presence of the trialkyl aluminum compound.

22 Claims, No Drawings

GEL-FREE PROCESS FOR MAKING HYDROGENATED FUNCTIONALIZED ANIONICALLY POLYMERIZED POLYMERS

This application claims the benefit of U.S. Provisional application Ser. No. 60/079,876, filed Mar. 30, 1998, the entire disclosure of which is hereby incorporated by reference.

FIELD OF THE INVENTION

This invention relates to a gel-free process for making functionalized polymers, primarily functionalized anionic polymers which are made using multi-lithium initiators. More particularly, this invention relates to a gel-free process for making polydiene diols.

BACKGROUND OF THE INVENTION

Functionalized anionically polymerized polymers of conjugated dienes and other monomers wherein the functionalization is terminal and/or internal are known. Particularly, U.S. Pat. No. 5,393,843 describes polybutadiene polymers having terminal functional groups. One of the methods described for making such polymers involves anionic polymerization utilizing a dilithium initiator such as the adduct derived from the reaction of m-diisopropenylbenzene with two equivalents of s-BuLi. Monomer is added to the initiator in hydrocarbon solution and anionic living polymer chains grow outwardly from the ends of the dilithium initiator. These polymers are then capped to form functional end groups as described in U.S. Pat. Nos. 4,417,029, 4,518,753, and 4,753,991. Of particular interest herein are terminal hydroxyl, carboxyl, sulfonate, and amine groups.

It has been observed that when the living polymer is reacted with the commonly available "capping" agents, the polymer in the hydrocarbon solution forms a gel. For purposes of this invention, a polymer gel is defined as a blend of a polymer and a hydrocarbon solvent that has a yield stress, that is, it will not flow unless it is acted on by at least some critical stress. A polymer gel as defined herein will require a significant application of force in order to initiate flow through an orifice. Of particular interest are gels that will not flow under the force of their own weight. The presence of gel that will not flow under the force of its own weight is readily detected by visual observation. This effect is observed by inverting a bottle containing the solution to see whether it flows to the bottom of the inverted flask. Gelled solutions will not readily flow to the bottom of the bottle.

The physical characteristics of these gels make them more difficult to handle in equipment which is designed for moving, mixing, or combining freely flowing liquids, i.e. materials without a significant yield stress. Pumps, reactors, heat exchangers, and other equipment that are normally used for making polymer solutions that can be characterized as viscous fluids are not typically suited to handling polymer gels. Thus, one would expect that processing equipment likely to be found at a manufacturing location that is designed to handle liquid polymer solutions, as defined above, would be ill suited to handling gels of this nature.

If the living carbon-alkali metal endgroups (chain ends) are first transformed to the "ate" complex (aluminate) by reaction with a trialkylaluminum compound, the addition of EO occurs nearly quantitatively, without the formation of gel. Addition of a trialkylaluminum compound can also dissipate a gel of this kind that has already formed. The molar ratio of the trialkyl aluminum compound to the polymer chain ends is generally at least 0.1:1, preferably 0.33:1 and most preferably 0.66:1 to 1:1 since this results in a freely flowing solution. Unfortunately, at the preferred aluminum levels, the hydrogenation activity of the Ni/Al catalysts that are often used in the hydrogenation of these polymers is poor. Substantially more catalyst and longer reaction time are required to reach an acceptable level of residual unsaturation in the trialkylaluminum-containing cements than in controls prepared in the absence of aluminum. The present invention provides a method whereby polymers using trialkylaluminum to mitigate the gel problem can be efficiently hydrogenated.

SUMMARY OF THE INVENTION

This invention relates to a gel-free process for making functionalized polymers. When multi-alkali metal initiators are used to make these polymers anionically, the process comprises anionically polymerizing at least one monomer with a multi-alkali metal initiator in a hydrocarbon solvent, functionalizing the polymer by adding to the polymer a capping agent that reacts with the ends of the polymer chains such that strongly associating chain ends are formed leading to formation of a polymer gel, adding a trialkyl aluminum compound to the polymer gel whereby the gel dissipates, optionally terminating the polymerization by addition of an alcohol, washing the polymer, terminated or not, with an aqueous acid, preferably mineral acid, solution, and hydrogenating the polymer with a hydrogenation catalyst. The concentration of the acid solution and the aqueous phase ratio (ratio of aqueous acid to polymer solution) are chosen so as to insure solubility of the extracted alkali metal and aluminum salts. If phosphoric acid is used, it is preferable to add a sufficient amount such that there is at least one mole of acid per mole of alkali metal and at least three moles of acid per mole of aluminum.

In a second embodiment, the present invention relates to a process for making such polymers which comprises anionically polymerizing them as described, adding to the polymer a trialkyl aluminum compound, and then adding the functionalizing reagent, optionally adding a terminating agent, and washing and hydrogenating the polymer as described above. In this second embodiment, the aluminum trialkyl may be added before or during polymerization or before or with the capping agent (i.e., before a gel can form-prior to any reaction of the alkali metal with the gel-forming functionality). In the first embodiment, a gel is formed and then removed. In the second embodiment, the gel never is formed because of the presence of the trialkyl aluminum compound.

DETAILED DESCRIPTION OF THE INVENTION

This invention relates to functionalized polymers and processes for avoiding gel formation, especially when such polymers are made by anionic polymerization using di- or multi-alkali metal, generally lithium, initiators. Sodium or potassium initiators can also be used. For instance, polymers which can be made according the present invention are those made from any anionically polymerizable monomer, especially including terminal and internal functionalized polydiene polymers, including random and block copolymers with styrene. Styrene copolymers hereunder can be made in the same manner as the polydiene polymers and can be random or block copolymers with dienes.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as lithium or sodium or potassium) compound in a suitable solvent at a temperature within the range from about −150° C. to about 150° C., preferably at a temperature within the range from about −70° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. The organolithium initiators are preferred for polymerization at higher temperatures because of their increased stability at elevated temperatures.

Functionalized polydiene polymers, especially terminally functionalized polybutadiene and polyisoprene polymers, optionally as copolymers, either random or block, with styrene, and their hydrogenated analogs are preferred for use herein. Especially preferred are polybutadiene diols. Such polymers are made as generally described above. One process for making these polymers is described in U.S. Pat. No. 5,393,843, which is herein incorporated by reference.

Using a polydiene diol as an example, butadiene is anionically polymerized using a difunctional lithium initiator such as the sec-butyllithium adduct of diisopropenylbenzene as an example. The living chain ends are then capped with a capping agent such as described in U.S. Pat. Nos. 4,417,029, 4,518,753, and 4,753,991, which are herein incorporated by reference. There are many multilithium initiators that can be used herein. The di- s-butyllithium adduct of m-diisopropenylbenzene is preferred because of the relatively low cost of the reagents involved and the relative ease of preparation. Diphenylethylene, styrene, butadiene, and isoprene will also work well to form dilithium initiators by the reaction:

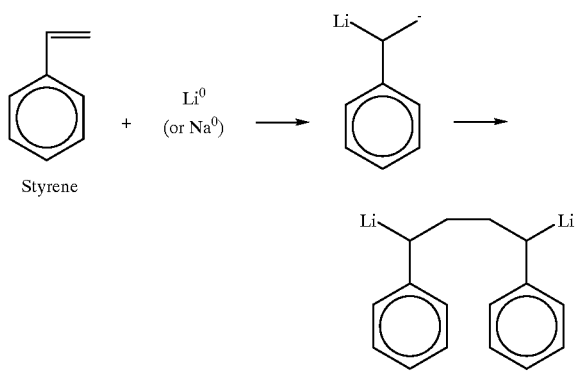

Still another compound which will form a diinitiator with an organo alkali metal such as lithium and will work herein is the adduct derived from the reaction of 1,3-bis(1-phenylethenyl)benzene (DDPE) with two equivalents of a lithium alkyl:

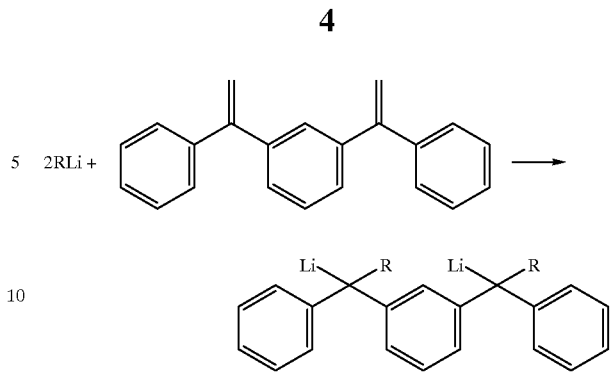

Related adducts which are also known to give effective dilithium initiators are derived from the 1,4-isomer of DDPE. In a similar way, it is known to make analogs of the DDPE species having alkyl substituents on the aromatic rings to enhance solubility of the lithium adducts. Related families of products which also make good dilithium initiators are derived from bis[4-(1-phenylethenyl)phenyl]ether, 4,4'-bis(1-phenylethenyl)-1,1'-biphenyl, and 2,2'-bis[4-(1-phenylethenyl)phenyl]propane (See L. H. Tung and G. Y. S. Lo, Macromolecules, 1994, 27, 1680–1684 (1994) and U.S. Pat. Nos. 4,172,100, 4,196,154, 4,182,818, and 4,196,153 which are herein incorporated by reference). Suitable lithium alkyls for making these dilithium initiators include the commercially available reagents (i.e., sec-butyl and n-butyl lithium) as well as anionic prepolymers of these reagents, polystyryl lithium, polybutadienyl lithium, polyisoprenyl lithium, and the like.

The polymerization is normally carried out at a temperature of 20 to 80° C. in a hydrocarbon solvent. The solution/dispersion/slurry of the polymer in the solvent is called the polymer cement. The cement usually has a solids (polymer) content in the range of 10 to 30 percent by weight (wt %) but it can range from 5 to 70 wt %. Suitable solvents include straight and branched chain hydrocarbons such as pentane, hexane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as dimethyl ether, methylethyl ether, diethyl ether, tetrahydrofuran and the like. The capping reaction is carried out in the same solution and usually at about the same temperature as the polymerization reaction, as a matter of convenience.

The general class of capping agents useful herein which form strongly associating chain ends and cause gelation are those which form alkali metal-O or alkali metal-N (preferably, LiO and LiN) bonds. Specific capping agents which are highly useful herein include ethylene oxide and substituted ethylene oxide compounds, oxetane and substituted oxetane compounds, aldehydes, ketones, esters, anhydrides, carbon dioxide, sulfur trioxide, aminating agents which form lithium imides, especially imines, and suitable reactive amine compounds like 1,5-diazabicyclohexane as described in U.S. Pat. No. 4,816,520 which is herein incorporated by reference. At least 0.1 mole of capping agent per mole of polymer chain end is necessary to give sufficient functionalization for most applications. It is preferred that from 1 to 10 moles of the capping agent per mole of polymer chain end be used in the capping of the polymer although the upper limit is only a practical one determined by cost benefit.

At this point in the process, the polymer forms a gel. A trialkyl aluminum compound is then added to this gel which then dissipates. The alternative process involves adding the trialkyl aluminum compound to the polymer mixture before the alkali metal reacts with the gel-forming functionality to form a gel. It may be added before, during, or after polymerization. In these cases, no polymer gel forms. If the trialkyl aluminum is added before or during polymerization, then less than a molar ratio of Al:Li of 1:1 should be added because the polymerization will stop if the ratio reaches 1:1. In yet another alternative, the trialkyl aluminum compound is added at the same time as the capping reagent. It may be premixed with the capping agent or just added to the reactor at the same time as the capping reagent. In this process, no polymer gel forms. Using triethyl aluminum as an example, it is believed that the mechanism of these two processes, adding the trialkyl aluminum reagent either before or after capping, is as follows:

This invention also facilitates hydrogenation in situations wherein a trialkylaluminum compound is used in the functionalization of an existing polymer or the conversion of the functionality of an already functionalized polymer to a different functional group using one of the gel-forming capping agents described herein.

Following functionalization, it is common practice to terminate the reaction by the addition of an alkanol, preferably methanol. It is preferable to add a sufficient quantity of the terminating alcohol to provide one mole of the alcohol per mole of alkali metal, usually lithium, and three moles of the alcohol per mole of aluminum. Reaction with the alcohol results in alcoholysis of the alkylaluminum. In the case of triethylaluminum, this is expected to result in a mixture of dialkoxyethylaluminum and trialkoxyaluminum, with the displaced ethyl groups having been converted into ethane. When terminal alcohol groups are introduced, for example, by reaction with ethylene oxide, addition of the alcohol also results in an equilibrium level of protonation of the polymer chain ends. Methanol is preferred in this case as the resulting

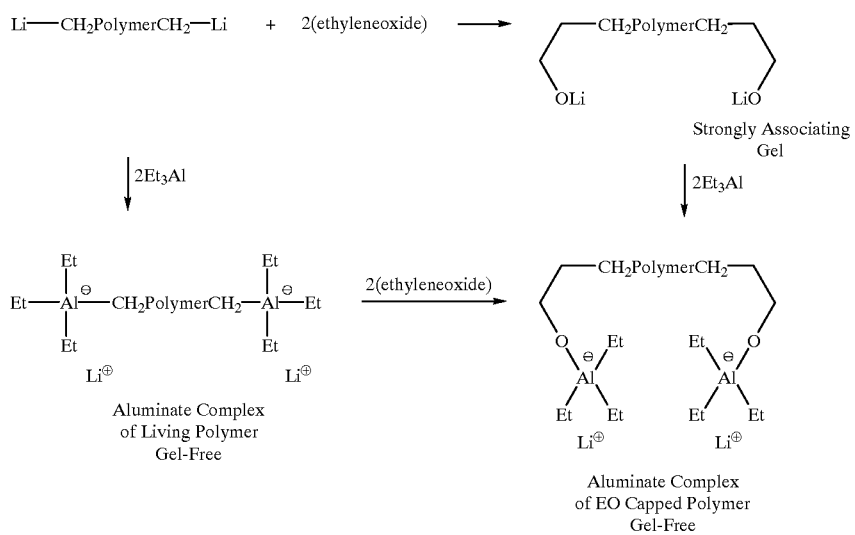

As described above, gel is avoided or removed by addition of a trialkyl aluminum compound. It is important that the chain end retains activity for nucleophilic substitution reactions after the "ate" complex has formed. Even after the trialkyl aluminum reagent has been added and the "ate" complex has formed, the chain end is still capable of further reaction. The trialkyl aluminum compounds used in the present invention are those wherein the alkyl groups contain from 1 to 10 carbon atoms. Preferred trialkyl aluminum compounds are triethyl aluminum, trimethyl aluminum, tri-n-propylaluminum, tri-n-butylaluminum, triisobutylaluminum, tri-n-hexylaluminum, and trioctyl aluminum because these reagents are readily available in commercial quantities. Triethylaluminum is most preferred as it is least expensive on a molar basis.

The molar ratio of the trialkyl aluminum compound to the polymer chain ends is generally at least 0.1:1, preferably 0.33:1 and most preferably 0.66:1 to 1:1 since this results in a freely flowing solution. If it is less than 0.1:1, then the level of reduction in gel is too low to give an observable reduction in either the shear stress or the viscosity of the solution. If the ratio is more that 1:1, then the cost goes up unnecessarily but the advantages are still achieved. It is advantageous to be able to use less aluminum for cost purposes.

equilibrium favors protonation of chain ends. If a less acidic alcohol, such as 2-ethylhexanol, is used, the polymer cement may exhibit the properties of a weak gel. Presumably, this is due to interaction of ionized chain ends with the alkoxy (alkyl)aluminum products. This step may be omitted. However, partial hydrolysis of the terminal "ate" complex leads to Al—O—Al bonds. In the absence of vigorous mixing, this can result in the temporary formation of a rather strong gel during the wash process. Also, this hydrolysis liberates substantial quantities of ethane gas, leading to problems with foaming. Hydrolysis of the alcohol reaction products is slower, leading to less problems with gel formation in wash, and does not liberate ethane as vigorously. For these reasons, it is generally desirable to terminate the polymerization with an alkanol after functionalization.

The polymer solution is then washed with aqueous acid. Mineral acids (phosphoric, sulfuric, hydrochloric acids, etc.) are generally preferable, as these acids are inexpensive, readily available, and have little tendency to partition into the organic phase. Acids that partition into the organic phase may interfere with hydrogenation. The quantity and strength of the acid used are chosen so that the salts that are produced are soluble. If phosphoric acid is used, it is preferable to add a sufficient quantity to supply 1 mole of acid per mole of lithium and at least 3 moles of acid per mole of Al. It is also preferable to use a relatively concentrated acid solution at a relatively low aqueous acid phase weight ratio. For a 20% solids content in the cement wherein the polymerization targets a molecular weight of about 4,000, it is most preferable to conduct the wash using 20% wt. to 40% wt. aqueous phosphoric acid at a aqueous acid phase weight ratio between about 0.1:1 and 0.25:1 aqueous acid:cement and at a temperature of about 45° C. to 55° C. Although this extraction is relatively insensitive to mixing conditions, it is preferable to avoid unnecessarily high shear. The cement should be allowed to settle until substantially free of entrained water. The wash can be performed under conditions of minimal dispersion ("dancing interface") contact, which results in very little entrainment of the aqueous acid in the organic phase, or by more vigorous mixing, followed by settling. The water concentration by Karl Fisher titration should then be on the order of 400 ppm. Surprisingly, the efficiency of hydrogenation of these cements with the standard Ni/Al catalyst was found to comparable to dry, aluminum-free solutions of comparable polymers. The Ni/Al catalyst can then be extracted into aqueous acid and the liquid polymer product isolated by devolatization.

Hydrogenation of polymers of conjugated dienes is typically accomplished with the use of nickel catalysts, as described in U.S. Pat. Nos. Re. 27,145 and 4,970,254 and U.S. patent application Ser. No. 07/785715, now U.S. Pat. No. 5,166,277 which are incorporated herein by reference. The preferred nickel catalyst is a mixture of nickel 2-ethylhexanoate and triethylaluminum. Hydrogenation may also be accomplished using the catalysts described in U.S. Pat. Nos. 3,415,759 and 5,057,582, which are herein incorporated by reference. These catalysts are made by contacting one or more Group VIII metal carboxylates (CAS version, Group VIIIA in the previous IUPAC form, and Groups VIII, IX and X in the new notation) with one or more alkyl alumoxanes which were prepared by reaction of an aluminum alkyl with water. As described in the above patents, such catalysts produce excellent results in that they selectively hydrogenate ethylenic unsaturation to a high degree while basically unaffecting the aromatic unsaturation. The preferred Group VIII metals are nickel and cobalt. Other homogeneous hydrogenation catalysts can be used including those made with Ti, Ru, Rh, etc. Heterogeneous hydrogenation catalysts can also be used including those made with Pt, Pd, Ni, Co, etc.

EXAMPLES

Diol Synthesis Reactions

Synthesis conditions and characterization are described in Table 1. Unless otherwise specified, the initiators were prepared by adding two moles of either s-butyllithium or t-butyllithium to one mole of m-diisopropenylbenzene in cyclohexane in the presence of one mole of diethylether (DEE) per mole of lithium at a temperature of 20° C. to 50° C. These initiators were used to polymerize butadiene in cyclohexane/10% wt. DEE in a 2 liter glass autoclave, targeting a butadiene number average molecular weight of 4,000 or 3,200. The initiator fragment and EO endcaps add another 530. In general, molecular weights were close to predicted (basis titration of the initiator) and polydispersities were relatively low, <1.2. Polymer solids in the cements were varied from 10% wt. to 20% wt. At greater than 10% solids, the monomer was added in several increments. An attempt was made to keep the polymerization temperature below 50° C. Vinyl contents in excess of 50% could be achieved if the average polymerization temperature was kept at or below about 25° C. Triethylaluminum (TEA) was used to break up, or prevent gel and ethylene oxide (EO) was reacted with the living chain ends in order to introduce the desired hydroxyl endgroups. Unless otherwise specified, one mole of TEA was added per mole of chain ends. Ethylene oxide was generally added in an amount of at least 20%.

The capping reaction was carried out according to one of the following procedures: (1) A bomb containing (EO) was connected to the reactor and a bomb containing an approximately 16% wt. solution of triethylaluminum in hexane was attached to it. The valves of the sample bombs were then opened sequentially, starting at the valve closest to the reactor, so that the EO was added, followed very rapidly by the alkyl aluminum solution. Reaction with EO is very fast, so gel was observed to form. This gel broke very rapidly, yielding a pale yellow, freely flowing, low viscosity solution. (2) Two bombs, one containing the desired quantity of EO and the other containing the desired quantity of an approximately 16% wt. solution of triethylaluminum (TEA) in hexane, were attached to the reactor as described above. When the polymerization was complete, the TEA solution was pressured into the bomb containing the EO and allowed to interact for about one minute. The contents were then pressured into the autoclave and allowed to react with the living chain ends for 30 minutes. While the heat of mixing of the EO and TEA was appreciable, $^1$H NMR of the mixture suggested that the reaction between EO and TEA was relatively slow under these conditions. No increase in viscosity was observed on addition of the mixture and the color faded to pale yellow, indicative of capping. (3) The desired quantity of about 16% to 25% wt. triethylaluminum solution was added and allowed to react with the living chain ends for 15 minutes. The reaction was exothermic enough to raise the temperature a few degrees. The yellow color of the polymer anion persisted, but the solution viscosity decreased noticeably, especially at higher polymerization solids. After 15 minutes, the EO charge was added and flushed in with about 44 grams of cyclohexane from a bomb attached above it, resulting in a temperature increase of a few degrees and a decrease in the color of the solution, but no increase in the viscosity. One polymerization, run 22930-83C, was performed at 0.5:1 TEA:Li. The resulting solution was higher in viscosity, but much less so than is obtained in the absence of TEA. Unless otherwise specified, methanol was then added to "terminate" the polymerization. Sufficient methanol was added to provide 1 mole of methanol per mole of lithium and about 3.1 moles of methanol per mole of aluminum. For comparison, a polymerization was conducted at 10% solids, EO was added, and the resulting gel was allowed to stand until the color of the entire reactor contents changed from the red-orange of the polymer anion to the pale yellow of the EO-capped diol. An excess of methanol was added to break the gel.

TABLE I

Synthesis Conditions for Preparation of Diinitiated Butadiene Polymers and Capping with EO.

| | Polymerization | | | | Capping Reaction | | | |
|---|---|---|---|---|---|---|---|---|
| Sample # | RLi | [DiLi] (N) | % Solids | Mn (¹H NMR) | Addition Order | TEA:Li | $t_{rxn}$ (min)[1] | EO/Li |
| 22930-82D | s-BuLi | 0.47 | 10% | 3700 | — | None | overnight | 1.3 |
| 22930-83C | s-BuLi | 0.47 | 10% | 3700 | EO 1st. | 1:1 | 30 | 1.2 |
| 22930-84B | s-BuLi | 0.47 | 10% | 3790 | EO 1st. | 1:1 | 30 | 1.2 |
| 22930-90A | s-BuLi | 0.38 | 10% | 3950 | Al to EO | 1:1 | 1 | 2.3 |
| 22930-104C | t-BuLi | 0.57 | 20% | 5290 | Al 1st | 1:1 | 15 | 2.4 |
| 22930-105B | t-BuLi | 0.57 | 20% | 4970 | Al 1st | 1:1 | 15 | 3.2 |
| 22930-107B | t-BuLi | 0.5 | 20% | 4470 | Al 1st | 1:1 | 15 | 2.4 |
| 22930-109B | s-BuLi | 0.57 | 10% | 4360 | Al 1st | 1:1 | 15 | 1.5 |

[1]Case (1): time EO/TEA mixture is in contact with PLi prior to termination; Case (2): time EO in contact with TEA prior to addition to PLi; Case (3): time TEA in contact with PLi prior to EO addition.

Hydrogenation

Unless otherwise specified, hydrogenation reactions were carried out in a 1 gal. SS autoclave using a Ni/Al catalyst prepared by reacting triethylaluminum and nickel octoate (2:1 Al:Ni), according to the following general procedure. The polymer cement was charged to the autoclave and sparged with argon (if the transfer was not conducted under nitrogen), and then with hydrogen. Only cements that had been washed were exposed to ambient atmosphere. The reactor was pressured up to 800 psi with hydrogen. The reactor temperature was adjusted to about 60° C. and then the first aliquot of catalyst solution was added. The autoclave was then heated to maintain a temperature of about 80° C. and reaction was allowed to proceed under 800 psi of $H_2$ for the desired time. Additional aliquots of catalyst were added as specified in Table 2 below. The catalyst was extracted with aqueous phosphoric acid (generally 20% wt). The extent of hydrogenation was determined using 1H NMR. These results are summarized in Table 2. Samples for further testing were washed with deionized water until the pH of the settled aqueous phase was <5 and then dried in a rotary evaporator.

A number of attempts were made to hydrogenate the alcohol terminated polymer solutions. Methanol-terminated cements prepared at a TEA:Li ratio of 1:1 remained poorly hydrogenated after quite long reaction times at high catalyst loadings, as evidenced by runs 22930-84C and 22930-90B. When 2-ethylhexanol (2-EH) was substituted for methanol, the cement gelled on standing. It was necessary to add methanol to break the gel before the solution could be hydrogenated. Not surprisingly, hydrogenation was quite difficult. Hydrogenation of the cement prepared using an 0.5:1 ratio of TEA to Li was more facile, but still rather difficult. After reaction with a total of 225 PPM Ni for a total reaction time of greater than 18 hours, 0.34 meq/g of residual unsaturation remained (98.0% conversion). The reactor was blocked-in at 800 psi hydrogen overnight at ambient temperature after a total of 125 PPM Ni had been added. By comparison, the cement prepared at 10% solids without adding TEA was hydrogenated to a residual unsaturation of 0.18 meq/g (98.9% conversion) in 2 hours in the presence of only 125 PPM Ni.

The solution provided herein is to wash the aluminum and lithium out with aqueous acid prior to hydrogenation. It is unexpected that this would work well since the Ni/Al catalyst is known to be susceptible to deactivation by relatively low levels of water. For this reason, extraction with aqueous acid would not be anticipated to lead to improved hydrogenation performance unless followed by some operation to remove residual water. The catalyst was extracted using aqueous phosphoric acid. In all cases, sufficient $H_3PO_4$ was added to provide 1 mole of acid per mole of lithium, and 3 moles of acid per mole of aluminum. At this ratio the aluminum phosphate salts were observed to remain soluble in the aqueous phase. Use of phosphoric acid at concentrations of 20% wt. to 40% wt. allows for aqueous acid phase weight ratios (aqueous:organic) in the range of 0.1:1 to 0.25:1. Unless otherwise specified, these extractions were performed in a glass resin kettle (with indents to act as baffles) at about 50° C. to 60° C.

The first pre-hydrogenation wash was carried out under minimally dispersive or "dancing interface" conditions, that is, the stir rate was set just below the point at which droplets of one phase began to break off and disperse into the other phase. Samples of the cement were collected and analyzed for water, aluminum, lithium, and phosphate during the extraction. This data is summarized in Table 3. The initially clear cement began to turn cloudy and increase in viscosity until a very weak gel formed. As the extraction continued, the cement near the interface began to clear and decrease in viscosity. After an hour, the entire cement phase was once again clear and low in viscosity. These observations suggest the following sequence of events. Initially, little metal extraction occurs but water begins to diffuse into the cement and reacts with aluminum to produce a weak gel. As the extraction proceeds, the aluminum and lithium are pulled into the aqueous phase until finally the cement is substantially free of metals. Indeed, a cement sample taken at 20 minutes was very high in Al and Li, while the 60 minute sample contained only about 45 ppm Al and 7 ppm Li. As expected, the water and phosphate levels were low, 450 ppm and 10 ppm, respectively. Little change occurred on settling for 1 hour. This cement (105B) was then hydrogenated with no further treatment. As can be seen front Table 3 hydrogenation was quite facile. The residual unsaturation was decreased to 0.27 meq/g after reaction for 2 hours in the presence of 150 ppm Ni. Addition of another 100 PPM of Ni reduced the value to 0.08 meq/g (over 99.5% conversion).

In a second experiment, the wash was carried out in a more conventional way. The cement and aqueous acid were mixed at a high enough stir rate to disperse the acid in the organic phase. After 20 minutes, stirring was discontinued and samples were taken at 15, 30 and 60 minutes. The low lithium and phosphate levels, even after less than an hour of settling, suggest that extraction is efficient and little of the aqueous acid remains entrained after a reasonable settling time. Contact with deionized water resulted in no further decrease in the level of ionic species. After settling overnight, the water, lithium and aluminum were down to 330 ppm, 2 ppm, and <10 ppm, respectively. This sample (107B) was also hydrogenated without difficulty, reaching an residual unsaturation of 0.1 meq/g in 3 hours with only 85 ppm of Ni.

The cements in the above examples were terminated with methanol. Contact with water should also effectively terminate the living chain ends. Since all of the aluminum and lithium are extracted in the wash, the hydrogenation should not be effected by how the polymerization is terminated.

In a third experiment, the "live" polymer cement was added directly to the aqueous acid. Under the mixing conditions of this experiment, a gel formed as the cement was added. The gel formed faster, and was stronger, than was observed in the "minimally-dispersive mixing" experiment. Foaming also occurred, presumably due to out-gassing of ethane. When cements were terminated with methanol, ethane evolution was slower. A significant fraction of the ethane produced by reaction with the alcohol was probably lost when the polymerization reactor was vented. The stir rate was increased to about 400 RPM to facilitate dissolution of the gel. Extraction and de-entrainment was less effective in this case. The final cement contained 780 ppm water, 57 ppm phosphate, 26 ppm Li, and 460 ppm Al. Nevertheless, the hydrogenation was accomplished without difficulty. An residual unsaturation of 0.22 meq/g was achieved after adding only 80 ppm Ni.

TABLE 2

Hydrogenation Results for Alcohol - Terminated and Washed Cements (no pre-hydrogenation extraction)

| | | Wash Conditions | | | 1st Catalyst Charge | | | | Second Catalyst Charge added | | | | 3rd Catalyst Charge added | | | |
|---|---|---|---|---|---|---|---|---|---|---|---|---|---|---|---|---|
| | | | Phase Ratio | | | | | | | | | | | | | |
| Run | Feed | $[H_3PO_4]$ | (Aq.: Organic) | RPM | PPM Ni | $T_{max}$ (°C.) | time (min) | RU (meq/g) | PPM Ni | at time (min) | time (min) | RU (meq/g) | PPM Ni | at time (min) | time | RU (meq/g) |
| 83A | 82D | — | — | — | 25 | 86 | 60 | 1.79 | 125 | 60 | 120 | 0.18 | — | — | — | — |
| 84A | 83C[c] | — | — | — | 25 | 83 | 60 | 1.96 | 125 | 60 | 120 | 0.81 | 225 | t[a] | t + 60 | 0.34 |
| 84C | 84B | — | — | — | 25 | 78 | 60 | 4.86 | 125 | 60 | 120 | 2.86 | 225 | 120 | 180 | 2.2 |
| 90B | 90A | — | — | — | 50 | 64 | 60 | 9.26 | 150 | 60 | 120 | 3.01 | 250 | 120 | 180 | 1.76 |
| 104D | 104C[b] | — | — | — | 100 | 94 | 60 | 6.27 | 200 | 60 | 120 | 4.5 | 300 | 120 | 225 | 3.5 |
| 106A | 105B | 40% | 0.11 | 200 | 50 | >100 | 60 | 2.13 | 150 | 60 | 120 | 0.27 | 250 | 120 | 250 | 0.08 |
| 107C | 107B | 20% | 0.21 | 400 | 10 | 103[d] | 30 | 15.35 | 35 | 30 | 90 | 0.49 | 85 | 90 | 180 | 0.1 |
| 110A | 109B[e] | 20% | 0.21 | 400 | 20 | 90[d] | 60 | 5.01 | 80 | 60 | 120 | 0.22 | — | — | — | — |

[a]sat in autoclave at room temp under $H_2$ overnight, brought to temp & last 100 PPM added next day.
[b]Initially terminated with 2-ethylhexanol; gelled, added methanol to break.
[c]0.5:1 TEA:Li.
[d]occurred after 2nd catalyst charge.
[e]cement washed without MeOH termination.

TABLE 3

Results With Use of Pre-Hydrogenation Extraction.

| | | | Initial | | | | | | | Sample #1 | | | | |
|---|---|---|---|---|---|---|---|---|---|---|---|---|---|---|
| Sample | acid | [HA] % wt. | phase ratio (w/w) | moles HA | min. mol. HA[1] | PPM Li | PPM Al | time (min) | RPM | PPM water | PPM Li | PPM Al | PPM P |
| 105B | $H_3PO_4$ | 40% | 0.11 | 0.38 | 0.38 | 728 | 2548 | 20 | 100 | 966 | 790 | 6000 | 31 |
| 107B | $H_3PO_4$ | 20% | 0.22 | 0.40 | 0.38 | 728 | 2548 | 15 | 0[2] | — | 4 | — | — |
| 109B | $H_3PO_4$ | 20% | 0.27 | 0.55 | 0.51 | 875 | 3375 | 60 | 0[4] | 1190 | — | — | 20 |

| Sample #2 | | | | | | Sample #3 | | | | |
|---|---|---|---|---|---|---|---|---|---|---|
| time (min) | RPM | PPM water | PPM Li | PPM Al | PPM P | time (min) | RPM | PPM water | PPM Li | PPM Al | PPM P |
| 20 | 200 | 785 | 194 | 1100 | 288 | 60 | 200 | 450 | 7 | 45 | <10 |
| 30 | 0 | — | 1 | — | <5 | 60 | 0 | — | 2 | — | <5 |
| overnight | 0 | 780 | 26 | 460 | 20 | — | — | — | — | — | — |

[1]For HA = $H_3PO_4$, minimum moles of acid = 3.1 HA:Al; 1 HA:Li.
[2]stirred at 400 RPM for 20', then allowed to settle
[3]water washed: 200 g water, 200 RPM, 5', then allowed to settle.
[4]cement was not MeOH terminated; gelled while adding cement tot time stirred 60', max RPM 400.

We claim:

1. A gel-free process for making hydrogenated functionalized anionic polymers using a multi-alkali metal initiator which comprises:

(a) anionically polymerizing at least one monomer with a multi-alkali metal initiator in a hydrocarbon solvent, (b) capping the polymer by adding to the polymer a capping agent that reacts with the ends of the polymer chains such that strongly associating chain ends are formed wherein a polymer gel is formed, (c) adding a trialkyl aluminum compound to the polymer gel whereby the gel dissipates, (d) optionally terminating the polymerization by addition of a terminating agent, (e) washing the polymer with aqueous acid, and (f) hydrogenating the polymer with a hydrogenation catalyst.

2. The process of claim 1 wherein the initiator is a dilithium initiator.

3. The process of claim 1 wherein the acid is a mineral acid.

4. The process of claim 3 wherein the mineral acid is phosphoric acid wherein there is at least one mole of phosphoric acid per mole of alkali metal and at least three moles of phosphoric acid per mole of aluminum.

5. The process of claim 4 wherein the concentration of the acid in step (e) is from 20 to 40 percent by weight and the phase weight ratio of aqueous acid to polymer plus solvent is from 0.1:1 to 0.25:1.

6. The process of claim 1 wherein the capping agent is selected from the group consisting of those that form chain ends with alkali metal-O or alkali metal-N bonds.

7. The process of claim 1 wherein the monomer is selected from the group consisting of butadiene, isoprene, and styrene.

8. The process of claim 7 wherein the monomer is butadiene or isoprene.

9. The process of claim 8 wherein the monomer is butadiene.

10. The process of claim 7 wherein the polymer is a polydiene diol.

11. The process of claim 10 wherein the polymer is a polybutadiene diol.

12. A gel-free process for making hydrogenated functionalized anionic polymers using a multi-alkali metal initiator which comprises:

(a) anionically polymerizing at least one monomer with a multi-alkali metal initiator in a hydrocarbon solvent, (b) adding a trialkylaluminum compound before or during polymerization or before or at the same time as the capping agent, (c) capping the polymer by adding to the polymer a capping agent which, in the absence of the trialkylaluminum compound, would react with the polymer chain ends to form strongly associating chain ends wherein a polymer gel would be formed, (d) optionally terminating the polymerization by addition of a terminating agent, (e) washing the polymer with aqueous acid, and (f) hydrogenating the polymer with a hydrogenation catalyst.

13. The process of claim 12 wherein the initiator is a dilithium initiator.

14. The process of claim 12 wherein the acid is a mineral acid.

15. The process of claim 14 wherein the mineral acid is phosphoric acid wherein there is at least one mole of phosphoric acid per mole of alkali metal and at least three moles of phosphoric acid per mole of aluminum.

16. The process of claim 15 wherein the concentration of the acid in step (e) is from 20 to 40 percent by weight and the phase weight ratio of aqueous acid to polymer plus solvent is from 0.1:1 to 0.25:1.

17. The process of claim 12 wherein the capping agent is selected from the group consisting of those that form chain ends with alkali metal-O or alkali metal-N bonds.

18. The process of claim 12 wherein the monomer is selected from the group consisting of butadiene, isoprene, and styrene.

19. The process of claim 18 wherein the monomer is butadiene or isoprene.

20. The process of claim 19 wherein the monomer is butadiene.

21. The process of claim 18 wherein the polymer is a polydiene diol.

22. The process of claim 21 wherein the polymer is a polybutadiene diol.

\* \* \* \* \*